United States Patent
Lee et al.

(10) Patent No.: US 7,088,689 B2
(45) Date of Patent: Aug. 8, 2006

(54) VLAN DATA SWITCHING METHOD USING ARP PACKET

(75) Inventors: Ju-Sup Lee, Kyungki-Do (KR); Jeong Hyun Choi, Kyungki-Do (KR)

(73) Assignee: LG Electronics Inc., Seoul (KR)

( * ) Notice: Subject to any disclaimer, the term of this patent is extended or adjusted under 35 U.S.C. 154(b) by 958 days.

(21) Appl. No.: 10/024,309

(22) Filed: Dec. 21, 2001

(65) Prior Publication Data

US 2002/0080800 A1 Jun. 27, 2002

(30) Foreign Application Priority Data

Dec. 23, 2000 (KR) .................................. 2000-81159

(51) Int. Cl.
*H04L 12/28* (2006.01)

(52) U.S. Cl. ........................ 370/282; 370/400; 370/238; 709/203; 709/238

(58) Field of Classification Search ................ 370/230, 370/238, 466, 467, 389, 400, 254, 401, 395.54, 370/278, 282, 496; 709/225, 223, 238–242, 709/203
See application file for complete search history.

(56) References Cited

U.S. PATENT DOCUMENTS 5,920,699 A * 7/1999 Bare ........................... 709/225
6,625,658 B1 * 9/2003 Oguchi et al. ............... 709/238

* cited by examiner

*Primary Examiner*—John Pezzlo
(74) *Attorney, Agent, or Firm*—Fleshner & Kim, LLP

(57) ABSTRACT

A virtual local area network(VLAN) data switching method uses an address resolution protocol(ARP) packet in VLAN constructed with one internet protocol(IP) subnet. This is achieved by making a source host broadcast an ARP request packet, making a Proxy ARP server prepare to transmit a virtual ARP request packet wherein the Proxy ARP server receives the ARP request packet, and making a destination host transmit an ARP response packet in direct to the source host through a switching unit wherein the destination host receives the virtual ARP request packet. Data transfer delay time for the data exchanged between different VLANs as well as the router load occurring in handling the traffic between VLANs are reduced, so that data handling performance for high-capacity multimedia data transferred on VLANs is improved.

9 Claims, 2 Drawing Sheets

VLAN DATA SWITCHING METHOD USING ARP PACKET

BACKGROUND OF THE INVENTION

1. Field of the Invention

The present invention relates to a virtual local area network(VLAN) data switching method using ARP packets, and more particularly, to a VLAN data switching method using an address resolution protocol(ARP) packet in a virtual local area network(VLAN) constructed with one IP subnet.

2. Background of the Related Art

Generally, local area network(LAN) is an information communication network enabling data communications between a plurality of computers. There are a variety of structures for LAN in accordance with their usages. Lately, in order to prevent the degradation of LAN performance due to broadcast traffic, a virtual local area network(VLAN) system divided into a plurality of VLANs operating in a manner that the same as a LAN has been developed.

In a VLAN a plurality if virtual LANs are separated in one switch so that a broadcast traffic occurring in one VLAN causes no influence on the traffic of other VLANs by separating their broadcasting domains.

Communication between VLANs is achieved by routing methods. First, one internet protocol(IP) subnet is allocated to one VLAN so that the communication between different VLANs is converted into a communication between different IP subnets. Second, a plurality of VLANs are allocated to one IP subnet.

In an environment where a plurality of VLANs are set up in one IP subnet, a packet communication between hosts connected to a switch is divided into an intra-VLAN traffic and an inter-VLAN traffic. In this case, intra-VLAN traffic is a traffic occurring when a packet is transmitted from one host to another host belonging to the same VLAN, while inter-VLAN is a traffic occurring when a packet is transmitted to another host belonging to another VLAN.

The communication between hosts belonging to one IP subnet recognizes a media access control(MAC) address of the corresponding host by generating an address resolution protocol(ARP) request message directly to the host for communication therewith.

FIG. 1 illustrates a diagram for a general VLAN data switching system, in which broadcasting domains are separated by separating a plurality of VLANs(VLAN1 and VLAN2) in one router so that a broadcast traffic occurring in one VLAN has no effect on the traffic of other VLANs.

A method of switching data between different VLANs is explained by referring to the above drawing.

Referring to FIG. 1, in order to transmit data from a source host P1 belonging to VLAN1 to a destination host P2 belonging to VLAN2, the source host P1 acquires an MAC address of a router R and then transmits a frame to the router R. The router R detects and analyzes the IP address information of the transmitted frame, and then generates a MAC address of the destination host P2. In this case, the MAC address of the source is changed into the MAC address of the router R, and the MAC address of the destination is changed into the MAC address of the destination host P2 corresponding to the destination IP address for transmission to the destination host P2.

Unfortunately, the VLAN data switching method according to the related art carries out the routing procedure via inter-VLAN traffic in a different VLAN environment, thereby a network bottleneck is concentrated on and causes a burden to a control processing unit(CPU) performing the routing operations.

Moreover, the VLAN data switching method according to the related art causes undesirable delays in data transfer time as well as increasing loads on the CPU in handling traffic between different VLANs.

Although, conventional hardware such as a forwarding engine of a high-speed router may be a solution for the above problems. Such additional hardware increases the overall cost of handling traffic.

SUMMARY OF THE INVENTION

Accordingly, the present invention is directed to a VLAN data switching method using ARP packets that substantially obviates one or more problems due to limitations and disadvantages of the related art.

An object of the present invention is to provide a VLAN data switching method using ARP packets which enable routing procedures to be minimized, which occurs when transferring data between different VLANs in a VLAN environment constructed with one IP subnet, by employing virtual ARP requests to achieve a direct switching operation by a switch.

Additional advantages, objects, and features of the invention will be set forth in part in the description which follows and in part will become apparent to those having ordinary skill in the art upon review of the following disclosure or may be learned from practice of the present invention. The objectives and other advantages of the present invention may be realized and attained by the structure particularly pointed out in the written description and claims hereof, as well as by the appended drawings.

To achieve these objects and other advantages and in accordance with the purpose of the invention, as embodied and broadly described herein, in a VLAN data switching system for handling traffic between source and destination hosts existing in different VLANs, a VLAN data switching method using ARP packets according to the present invention is characterized in that a unicast packet is transmitted directly between the source and destination hosts using a virtual ARP request packet.

In another aspect of the present invention, a VLAN data switching method using an ARP packet includes the steps of making a source host broadcast an ARP request packet, making a Proxy ARP server prepare to transmit a virtual ARP request packet wherein the Proxy ARP server receives the ARP request packet, and making a destination host transmit an ARP response packet directly to the source host through a switching unit wherein the destination host receives the virtual ARP request packet.

In a further aspect of the present invention, a VLAN data switching method using an ARP packet includes the steps of making a source host broadcast an ARP request packet, storing a MAC address of the source host in a MAC table, making a Proxy ARP server prepare to transmit a virtual ARP request packet wherein the Proxy ARP server receives the ARP request packet, making a destination host transmit an ARP response packet directly to the source host wherein the destination host receives the virtual ARP request packet, storing a MAC address of the destination host in the MAC table, and making the source host transmit data by directly using the MAC address of the destination host.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this disclosure, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Address resolution protocol(ARP) is a protocol used for corresponding an internet protocol(IP) address to a physical network address in an internet protocol(IP) network, which is used for finding an media access control(MAC) address for data communication when the IP address is known. In this case, in the ARP, a message requesting the MAC address is exchanged for a message responding the MAC address of a destination.

Moreover, the ARP recognizes a MAC address of a destination host or of a gateway using a broadcasting for the IP address of the destination. A collected IP address and the corresponding MAC address are stored in a memory(i.e., an ARP cache) of each IP host in a table form so as to be used for a next packet transmission procedure. Therefore, the ARP always checks the ARP cache for the IP address and MAC address prior to requesting the MAC address.

Proxy ARP means that a router, instead of a host of one side, responds to a request of a host of the other side. In this case, two hosts belong to an IP subnet(e.g.,"logical broadcast"), and each belongs to respective VLANs(e.g.,"physical broadcast domains") whereby each VLAN is different from one another.

The present invention minimizes a delay time of the corresponding data by transmission replacing the conventional method of a routing of an inter-VLAN traffic by a method of switching using Proxy ARP in a communications environment where a plurality of VLANs are established in one IP subnet.

Figure 1:
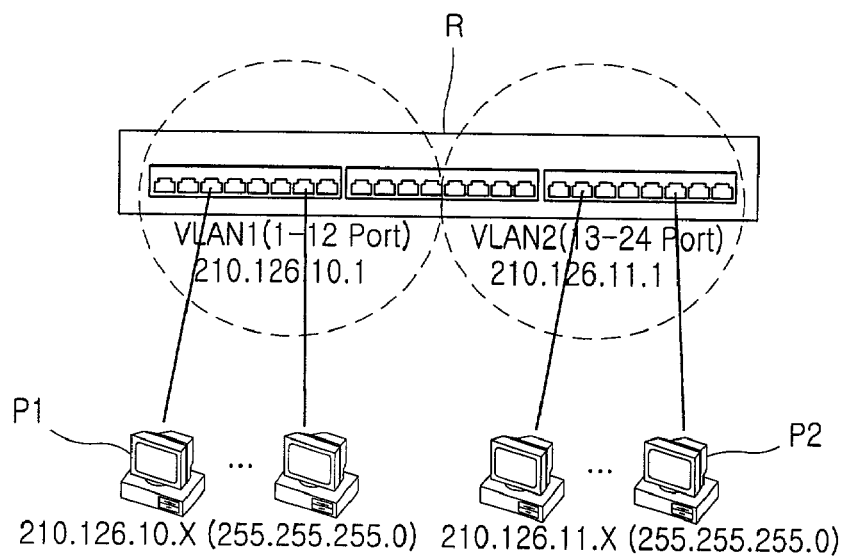
FIG. 1 illustrates a diagram for a general VLAN data switching system.
Figure 2:
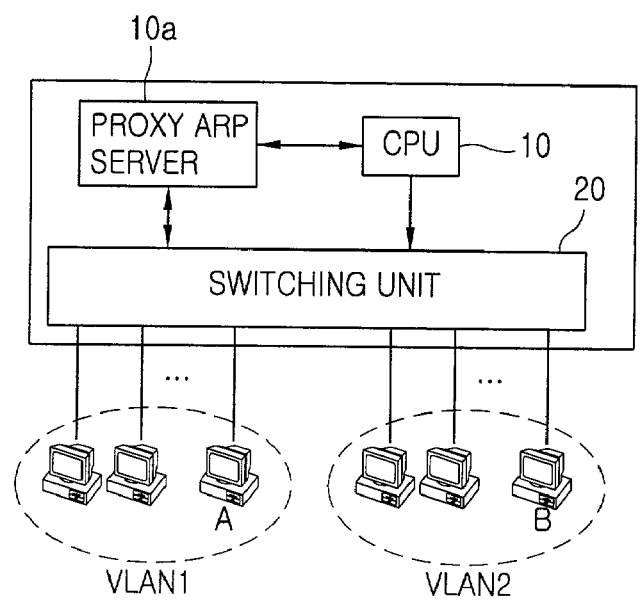
FIG. 2 illustrates a diagram for a VLAN data switching system according to the present invention.
Figure 3:
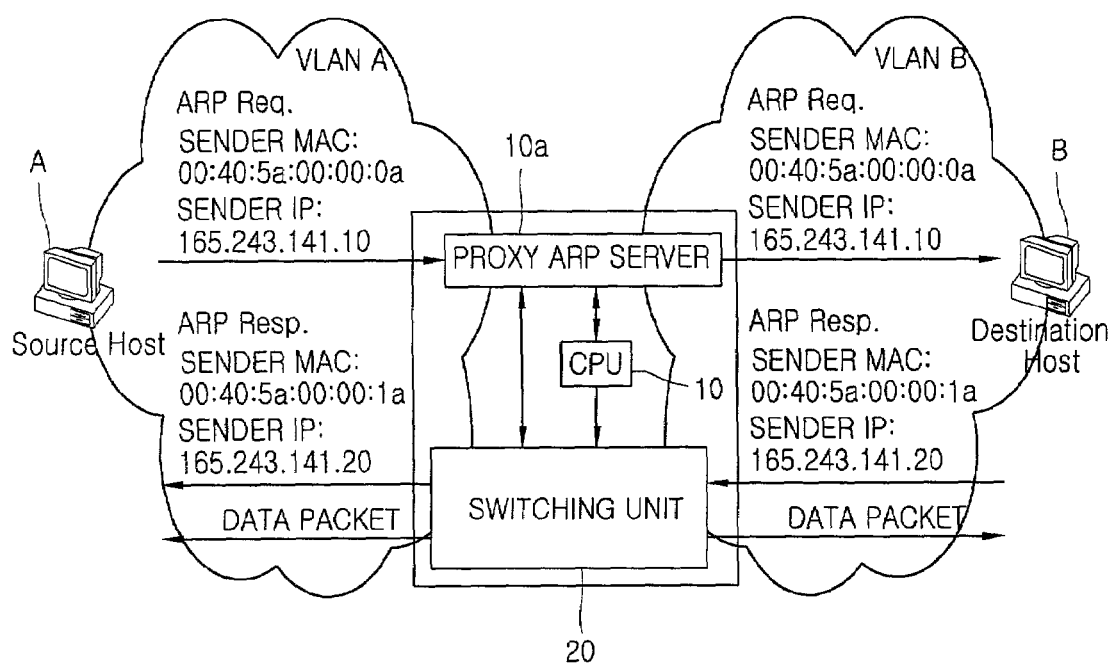
FIG. 3 illustrates a method of switching VLAN data using an ARP packet according to the present invention.

FIG. 2 illustrates a diagram for a VLAN data switching system according to the present invention, and FIG. 3 illustrates a method of switching VLAN data using an ARP packet according to the present invention.

Referring to FIG. 2, a VLAN data switching device according to the present invention includes a plurality of VLANs (VLAN1 and VLAN2) classified by defining a plurality of hosts as broadcast domains, a switching unit 20 switching data between the respective hosts, and a CPU 10 driving a Proxy ARP server 10*a* to find an MAC address of a host existing on a different LAN by generating a virtual ARP request message.

In this case, the Proxy ARP server 10*a* stores a source A of an inter-LAN data, and an IP address and a MAC address of a destination host B, generates a virtual ARP request packet including IP and MAC addresses of the destination host A, and transmits the virtual ARP request packet to the destination host B, whereby the destination host B receiving the corresponding packet enables the ARP request packet to be transferred directly to the source host A. Namely, the ARP request packet is transferred by a switching of two adjacent layers through the Proxy ARP server 10*a* and the switching unit 20. In this case, the Proxy ARP server 10*a* includes a MAC table(not shown in the drawings) storing the MAC and IP addresses for the hosts belonging to the respective VLANs.

A virtual port belonging to all of the VLANs classified in the overall system is allocated to the Proxy ARP server 10*a*. When the Proxy ARP server 10*a* generates(to transmit the virtual ARP request packet) the transmitted IP and MAC addresses of the packet to include address information of the original source host A to receive transmission. Thus, instead of the IP and MAC addresses of the Proxy ARP server 10*a*, the IP and MAC addresses of the source host A are transmitted. In this case, the system may misinterpret this situation to be that the port of the source host A is being changed into that of the Proxy ARP server 10*a*. Hence, when the Proxy ARP server 10*a* transmits the virtual ARP request packet, a port moving sensor function of the switch should be disabled.

The destination host B transmits a response packet to the virtual ARP request packet transmitted through the Proxy ARP server 10*a*, the ARP response packet is directly transmitted to the source host A via the switching unit 20, and the source host A having received the ARP response packet secures the MAC address of the destination host B so as to make a unicast packet switched to the destination host B directly through the switching unit 20.

An operation of the above VLAN data switching system is explained in detail by referring to FIG. 3.

FIG. 3 illustrates a method of switching VLAN data using an ARP packet according to the present invention.

Referring to FIG. 3, the source host A broadcasts an ARP request packet to the network to attain the MAC address of the destination host B belonging to another VLAN. In this case, the MAC address of, for example, 00:40:5a:00:00:0a of the source host A is connected to a port x, and is registered to the MAC table(not shown in the drawing).

The Proxy ARP server 10*a* receiving the ARP request packet transmitted from the source host A prepares to transmit a virtual ARP request packet including the MAC address 00:40:5a:00:00:0a and an IP address of, for example, 165.243.141.10 of the source host A. In this case, a virtual port "z" belonging to all of LANs existing in the system is allocated to the Proxy ARP server 10*a*. Therefore, the port moving sensor function of the switching unit 20 should be disabled so that the source host A is recognized as the "real" source host instead of the virtual port "z" allocated to the Proxy ARP server 10*a*.

The destination host B connected to a virtual port "y" transmits the ARP response packet including its MAC address 00:40:5a:00:00:1a and IP address 165.243.141.20 for the ARP request packet transmitted through the Proxy ARP server 10*a*. In this case, it is registered into the MAC table(not shown in the drawing) that the MAC address 00:40:5a:00:00:1a of the destination host B is connected to the port "y". Therefore, the ARP response packet is directly transferred to the source host A through the switching unit 20.

As the MAC and IP addresses of the source and destination hosts A and B are confirmed, a data packet between the source and destination hosts A and B located in different VLANs becomes unicast through the switching unit 20 using the information registered to the MAC table.

Accordingly, the VLAN data switching method of the present invention using ARP packets reduces a transfer delay time for the data exchanged between the different VLANs, and also reduces the router load occurring in handling the data traffic between VLANs, thereby enabling an improvement in handling performance for high-capacity multimedia data transferred between VLANs.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A virtual local area network (VLAN) data switching method using an address resolution protocol (ARP) packet, comprising the steps of:

making a source host broadcast an ARP request packet;

making a Proxy ARP server prepare to transmit a virtual ARP request packet in accordance with the ARP request packet received from the source host; and making a destination host transmit an ARP response packet directly to the source host through a switching unit upon the destination host receiving the virtual ARP request packet from the proxy ARP server, wherein a port moving sensor function of the switching unit is disabled so that the source host is not misinterpreted as being connected to a port to which the Proxy ARP server belongs.

2. The method of claim 1, wherein the virtual ARP request packet is transmitted with an internet protocol (IP) address and media access control (MAC) address of the source host included therein.

3. The method of claim 1, wherein the ARP response packet is transmitted directly to the source host and such that the destination host includes its own internet protocol (IP) address and its own media access control (MAC) address in response to the virtual ARP request packet.

4. The method of claim 1, wherein the step of making a source host broadcast an ARP request packet includes a step of storing a media access control (MAC) address of the source host in a media access control (MAC) table.

5. The method of claim 1, wherein the step of making a destination host transmit an ARP response packet includes the steps of:

storing a media access control (MAC) address of the destination host in a media access control (MAC) table; and transmitting the ARP response packet to the source host through the switching unit.

6. The method of claim 1, wherein the method further comprises a step of the source and destination hosts directly exchanging data packets using a MAC address stored in a MAC table.

7. A virtual local area network (VLAN) data switching method using an address resolution protocol (ARP) packet, comprising the steps of:

making a source host broadcast an ARP request packet;

storing a MAC address of the source host in a MAC table;

making a Proxy ARP server prepare to transmit a virtual ARP request packet in accordance with the ARP request packet received from the source host;

making a destination host transmit an ARP response packet directly to the source host upon the destination host receiving the virtual ARP request packet from the proxy ARP server;

storing a MAC address of the destination host in the MAC table; and making the source host transmit data directly to the destination host using the MAC address of the destination host, wherein a port moving sensor function of a switch is disabled so that the source host is not misinterpreted as being connected to a port to which the Proxy ARP server belongs.

8. The method of claim 7, wherein the virtual ARP request packet is transmitted with an internet protocol (IP) address and a media access control (MAC) address of the source host included therein.

9. The method of claim 7, wherein the ARP response packet is transmitted directly to the source host and such that the destination host includes its own internet protocol (IP) address and its own media access control (MAC) address in response to the virtual ARP request packet.

* * * * *